US011947586B2

(12) United States Patent
Sun et al.

(10) Patent No.: US 11,947,586 B2
(45) Date of Patent: Apr. 2, 2024

(54) VIDEO PROCESSING OPTIMIZATION AND CONTENT SEARCHING

(71) Applicant: Oracle International Corporation, Redwood Shores, CA (US)

(72) Inventors: Wenchao Sun, Saratoga, CA (US); Dru Kingston Borden, Boulder, CO (US); Tsz-Yam Lau, Hayward, CA (US); Shi-Rong Chang, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 86 days.

(21) Appl. No.: 17/532,686

(22) Filed: Nov. 22, 2021

(65) Prior Publication Data

US 2022/0414138 A1 Dec. 29, 2022

Related U.S. Application Data

(60) Provisional application No. 63/216,454, filed on Jun. 29, 2021.

(51) Int. Cl.
*G06F 16/00* (2019.01)
*G06F 16/41* (2019.01)
(Continued)

(52) U.S. Cl.
CPC ............ *G06F 16/435* (2019.01); *G06F 16/41* (2019.01); *G06F 16/438* (2019.01); *G06F 16/48* (2019.01);
(Continued)

(58) Field of Classification Search
CPC ...... G06F 16/435; G06F 16/41; G06F 16/438; G06F 16/48; G06F 16/71; G06F 16/7844;
(Continued)

(56) References Cited

U.S. PATENT DOCUMENTS 6,721,361 B1 4/2004 Covell et al.
7,606,444 B1 * 10/2009 Erol ..................... G11B 27/034
382/305
(Continued)

FOREIGN PATENT DOCUMENTS

CN 110012349 B 9/2019
CN 112287914 B 4/2021
WO 2020254890 A1 12/2020

OTHER PUBLICATIONS

Current State of OCR: Is it a Solved Problem in 2021?, AI Multiple, Available Online at: https://research.aimultiple.com/ocr-technology/, Jan. 1, 2021, 6 pages.
(Continued)

*Primary Examiner* — Paul Kim
(74) *Attorney, Agent, or Firm* — Invoke

(57) ABSTRACT

Techniques are disclosed for automatic scene detection and character extraction. In one example, audiovisual content with video frames, an audio recording, and timing information is received. A score, based on the frame's visual characteristics, is determined for a first frame and subsequent frames. The first frame's score and subsequent frame's scores are compared to determine if the difference between the scores is above a threshold. When the difference in scores is above a threshold, the subsequent frame is classified as a new scene. The audiovisual content is segmented into scenes and textual characters are identified in at least one frame from each scene. The characters are stored and indexed in a searchable database with the timing information for the scene where the characters were identified. The audio recording is transcribed and the transcribed words are stored and indexed in the searchable database with timing information.

22 Claims, 11 Drawing Sheets

(51) Int. Cl.
*G06F 16/435* (2019.01)
*G06F 16/438* (2019.01)
*G06F 16/48* (2019.01)
*G06V 10/46* (2022.01)
*G06V 10/56* (2022.01)
*G06V 20/40* (2022.01)
*G06V 30/19* (2022.01)
*G10L 15/26* (2006.01)
*G10L 15/30* (2013.01)

(52) U.S. Cl.
CPC .............. *G06V 10/46* (2022.01); *G06V 10/56* (2022.01); *G06V 20/49* (2022.01); *G06V 30/191* (2022.01); *G10L 15/26* (2013.01); *G10L 15/30* (2013.01)

(58) Field of Classification Search
CPC .... G06F 16/7834; G06V 10/46; G06V 10/56; G06V 20/49; G06V 30/191; G06V 30/10; G10L 15/26; G10L 15/30; G11B 27/28; G11B 27/327; H04N 21/23418
See application file for complete search history.

(56) References Cited

U.S. PATENT DOCUMENTS

| | | | |
|---|---|---|---|
| 9,230,547 B2 | 1/2016 | Wilder et al. | |
| 2019/0228231 A1* | 7/2019 | Tandon | G06V 20/41 |
| 2020/0250608 A1 | 8/2020 | Sharma et al. | |
| 2020/0327160 A1* | 10/2020 | Hsieh | H04N 21/26603 |
| 2021/0158845 A1 | 5/2021 | Sethi et al. | |
| 2022/0335243 A1* | 10/2022 | Yin | G06F 16/7867 |

OTHER PUBLICATIONS

"HSL and HSV", Wikipedia, Available Online at: https://en.wikipedia.org/wiki/HSL_and_HSV, May 1, 2021, 17 pages.
"Shot Transition Detection", Wikipedia, Available Online at: https://en.wikipedia.org/wiki/Shot_transition_detection, May 5, 2021, 6 pages.
Chen et al., "Text Detection and Recognition in Images and Video Frames", Pattern Recognition, vol. 37, No. 3, 2004, pp. 595-608.
Parveen et al., "Video Data Retrieval Based On Text Content Detection", Journal of Electronics and Communication Engineering, Second International Conference on Electrical, Information and Communication Technology, 2016, pp. 38-43.

* cited by examiner

VIDEO PROCESSING OPTIMIZATION AND CONTENT SEARCHING

CROSS-REFERENCE TO RELATED APPLICATIONS

This application is a non-provisional of and claims the benefit and priority under 35 U.S.C. 119(e) of U.S. Provisional Application No. 63/216,454, filed on Jun. 29, 2021, entitled "VIDEO PROCESSING OPTIMIZATION AND CONTENT SEARCHING," which is incorporated by reference herein in its entirety for all purposes.

BACKGROUND

Techniques exist for scene detection in audiovisual content. However, tagging video content to be searchable by the video's target audience can be labor intensive and time consuming. Missing proper tagging can result in missed opportunities and increased operational, support, and marketing costs.

BRIEF SUMMARY

Techniques are provided for enabling an electronic device to divide audiovisual content into scenes, extract textual characters and transcribed audio from the scenes, and store the characters and transcription in a searchable database based on the audiovisual content's timing information.

In an embodiment, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method. The computer-implemented method also includes receiving audiovisual content comprising a plurality of video frames and an audio recording. The method also includes determining, for a frame of the plurality of video frames, a first score based at least in part on a set of visual characteristics of the frame. The method also includes determining whether a difference between the first score and subsequent scores for subsequent frames of the plurality of video frames is above a threshold. The method also includes, in accordance with a determination that the difference is above a threshold, segmenting the plurality of video frames into a plurality of scenes. The method also includes identifying, in at least one frame of at least one scene of the plurality of scenes, one or more textual characters. The method also includes storing the identified one or more textual characters into a searchable database based at least in part on first timing information associated with the at least one frame of the at least one scene. The method also includes transcribing the audio recording. The method also includes storing words of the transcribed audio recording in the searchable database based at least in part on second timing information associated with the words of the transcribed audio recording. The method also includes indexing at least one of the stored one or more textual characters or the words to create an index. Other embodiments of this aspect include corresponding computer systems, apparatus, and computer programs recorded on one or more computer storage devices, each configured to perform the actions of the methods.

One general aspect includes one or more non-transitory computer-readable storage media may include computer-executable instructions that, when executed by one or more processors of a computing device, cause the computing device to perform instructions comprising: receiving audiovisual content comprising a plurality of video frames and an audio recording. The media also includes determining, for a frame of the plurality of video frames, a first score based at least in part on a set of visual characteristics of the frame. The media also includes determining whether a difference between the first score and subsequent scores for subsequent frames of the plurality of video frames is above a threshold. The media also includes segmenting, in accordance with a determination that the difference is above a threshold, the plurality of video frames into a plurality of scenes. The media also includes identifying, in at least one frame of at least one scene of the plurality of scenes, one or more textual characters. The media also includes storing the identified one or more textual characters into a searchable database based at least in part on first timing information associated with the at least one frame of the at least one scene. The media also includes transcribing the audio recording. The media also includes storing words of the transcribed audio recording in the searchable database based at least in part on second timing information associated with the words of the transcribed audio recording. The media also includes index at least one of the stored one or more textual characters or the words. Other embodiments of this aspect include corresponding computer systems, apparatus, and computer programs recorded on one or more computer storage devices, each configured to perform the actions of the methods.

One general aspect includes a system with a memory configured to store a plurality of instructions and one or more processors configured to access the memory, and to execute the plurality of instructions to at least: receive audiovisual content comprising a plurality of video frames and an audio recording. The system is also configured to determine, for a frame of the plurality of video frames, a first score based at least in part on a set of visual characteristics of the frame. The system is also configured to determine whether a difference between the first score and subsequent scores for subsequent frames of the plurality of video frames is above a threshold. The system is also configured to, in accordance with a determination that the difference is above a threshold, segment the plurality of video frames into a plurality of scenes. The system is also configured to identify, in at least one frame of at least one scene of the plurality of scenes, one or more textual characters. The system is also configured to store the identified one or more textual characters into a searchable database based at least in part on first timing information associated with the at least one frame of the at least one scene. The system is also configured to transcribe the audio recording. The system is also configured to store words of the transcribed audio recording in the searchable database based at least in part on second timing information associated with the words of the transcribed audio recording. The system is also configured to index at least one of the stored one or more textual characters or the words. Other embodiments of this aspect include corresponding computer systems, apparatus, and computer programs recorded on one or more computer storage devices, each configured to perform the actions of the methods.

BRIEF DESCRIPTION OF THE DRAWINGS

FIG. 4 is a simplified flow diagram illustrating a process for scene detection and character extraction from audiovisual content, according to some embodiments;

DETAILED DESCRIPTION

Figure 1:
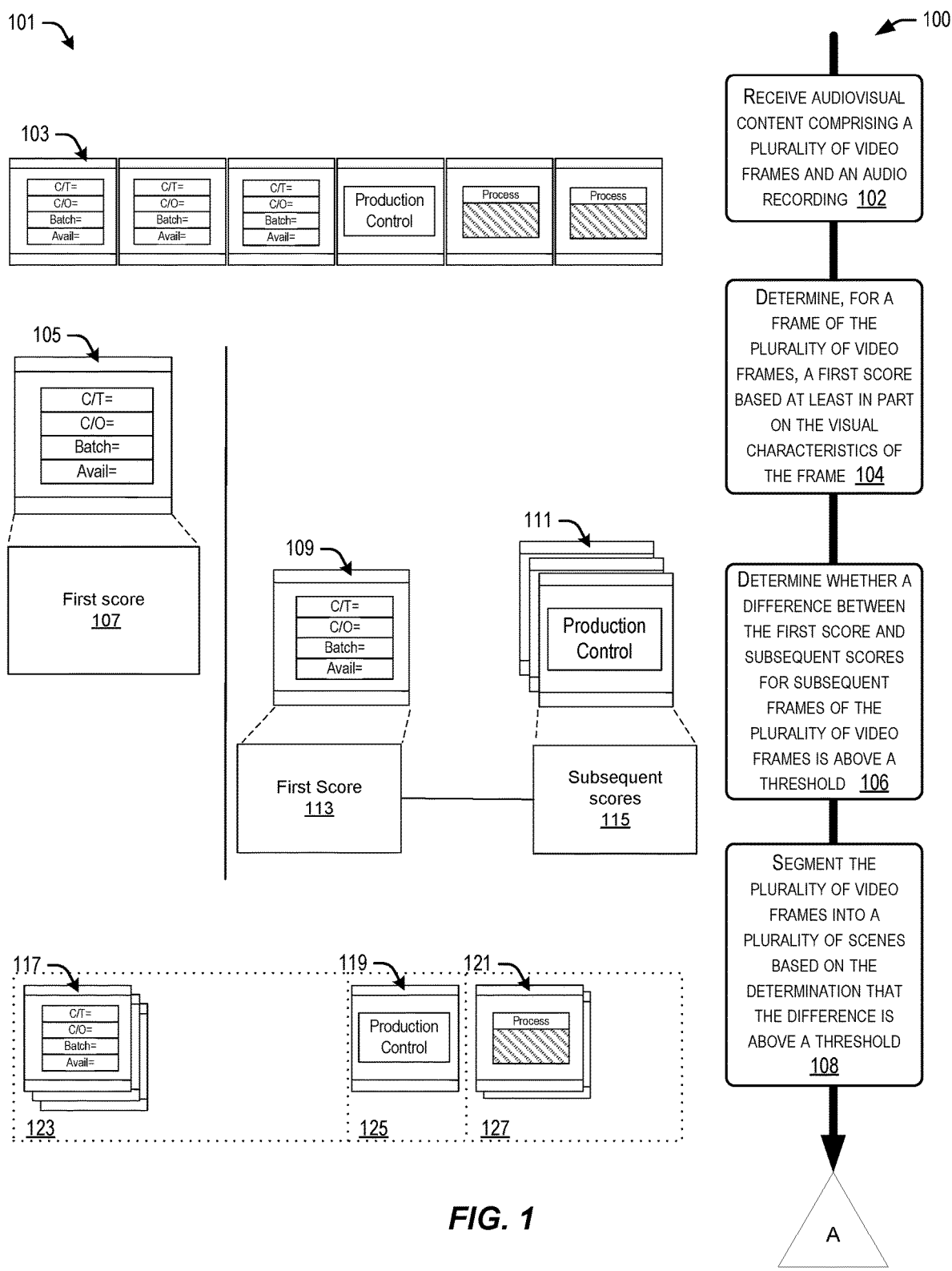
FIG. 1 is a simplified block diagram illustrating at least some example techniques for scene detection and character extraction from audiovisual content, according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure provide techniques for automatic scene detection and character extraction from audiovisual content. The audiovisual content may include video frames and an audio recording. The audiovisual content may be a presentation video (e.g., including a slideshow or at least one slide of a slide deck) or a video feed with text based display (e.g., news ticker or scoreboard). In some implementations, the audiovisual content can include multiple video feeds at the same time (e.g., a video showing a slide deck next to or otherwise adjacent to a video feed of the presenter). The audiovisual content can be automatically divided (e.g., segmented) into scenes based on a comparison between video frames (e.g., shot transition detection). In some instances, a new scene can be detected based on a comparison between a frame characteristic detected in any frame of a video and subsequent frame characteristics of any subsequent frames of the video. Frame characteristics can include pixel color, pixel density, or the outlines of objects.

Once the scenes are detected, optical character recognition (OCR) can be used to detect textual characters. The number of frames in a video makes OCR computationally demanding for video processing (e.g., 108,000 frames in an hour long video running at 30 frames per second). The computational burden of applying OCR to a video can be mitigated by limiting the number of frames that are analyzed. Scene detection is based on the similarity of frames in a scene (e.g., frames are grouped in a scene if the difference between frames visual characteristics is below a threshold). Because of the similarity of frames within a scene, OCR can be run on a single frame in each scene or a subset of frames in the scene to reduce the computational burden of identifying textual characters in audiovisual content. Any recognized characters can be stored with the audiovisual content's timing information (e.g., time the scene begins or time of the frame where the character was identified). The stored characters can form a searchable database that points to the location in the audiovisual content indicated by the character's timing information (e.g., a search for "process" returns a link to the video starting at 4:30 where "program" was identified).

The audiovisual content's audio component (e.g., audio recording) can be transcribed using any type of transcription method. The timing information from the recording can be used to store the transcribed words in a searchable database. A search for a word in the database can point to the scenes where the transcribed word was mentioned (e.g., beginning of scene 2 at 2:30). The database can include either or both the recognized characters and/or the transcription. A search can return either or both recognized characters and/or transcribed words or the user can select to search for characters and transcribed words individually.

In an illustrative example, the audiovisual content is a presentation (e.g., educational, business, or training presentation) with the video content showing a slide deck and the audio content including a recording of the presenter's speech. In this example, the presenter proceeds sequentially through a slide deck, discussing the content of each slide in turn. The slides contain a high level outline with the presentation's main points. The presenter shows a slide to the audience and addresses the points raised in the slide before moving to a subsequent slide. Accordingly, in a video recording of the presentation, when a slide is shown, it is a reasonable assumption that at least one of the topics written in the slide is being addressed. By dividing the presentation into scenes based on which slide is shown, the audiovisual content containing the presentation is divided by topic. In some implementations the scene detection algorithm is calibrated based on the slides (e.g., the algorithm can be more sensitive to changes in pixel color because the slides have known color schemes). The characters in the slide shown during a scene are extracted and associated with the scene in a searchable database containing the timing information for that scene. Similarly, the presenter's speech is transcribed and stored and indexed with the timing information. A search of the database for a term returns the timing information for any scenes containing the written term or points where the presenter says the term.

In some implementations, the pixels in a frame, or a subset of the pixels, are individually given a score based on the frame characteristics (e.g., pixel color). A pixel in the first frame can be compared to a corresponding pixel in the subsequent frame (e.g., a pixel in the same position in both frames) and the difference in the scores for each pixel are summed (e.g., sum of absolute differences (SAD)). If the sum of the differences is above a threshold, the subsequent frame is the beginning of a new scene. The subsequent frame can become the first frame in a new scene and the scene's frames can be compared to subsequent frames until a new scene is detected. In a different implementation, the scene detection can involve a comparison of the total number of pixels shaded a particular color rather than a one to one comparison between the color of individual pixels. A score can be calculated for the first frame by summing the total number of pixels shaded a particular color (e.g., histogram differences). In some implementations the number of pixels can be tabulated for all colors in the frame or a subset of the colors in the frame. The total number of pixels shaded a color in the first frame is compared to the total number of pixels shaded that same color in a subsequent frame. The comparison between the total number of pixels can be calculated for each color to calculate the difference between the two frame's scores. If the difference exceeds a threshold, the subsequent frame represents a new scene.

In a different implementation, the scene detection can be based on a comparison of the outlines of shapes in a first frame and subsequent frames (e.g., edge change ratio (ECR)). The frames can be changed to an image composed of the outlines of recognized objects in the frame (e.g., edge pictures). The first frame's edge picture can be compared to the subsequent frame's edge picture (e.g., by dilation) to determine a score (e.g., probability that the subsequent frame does not contain the objects from the first frame). If the score is above a threshold, the subsequent frame represents the beginning of a new scene. In some implementations two or more of the scene detection methods described herein can be combined. The combined scene detection methods can be given equal weight, or the methods can be given individual weights (e.g., one method given a higher weight because it is considered more reliable). In some implementations, the scene detection method can analyze a subset of the video frame (e.g., left half of the frame or inside a slide).

Figure 2:
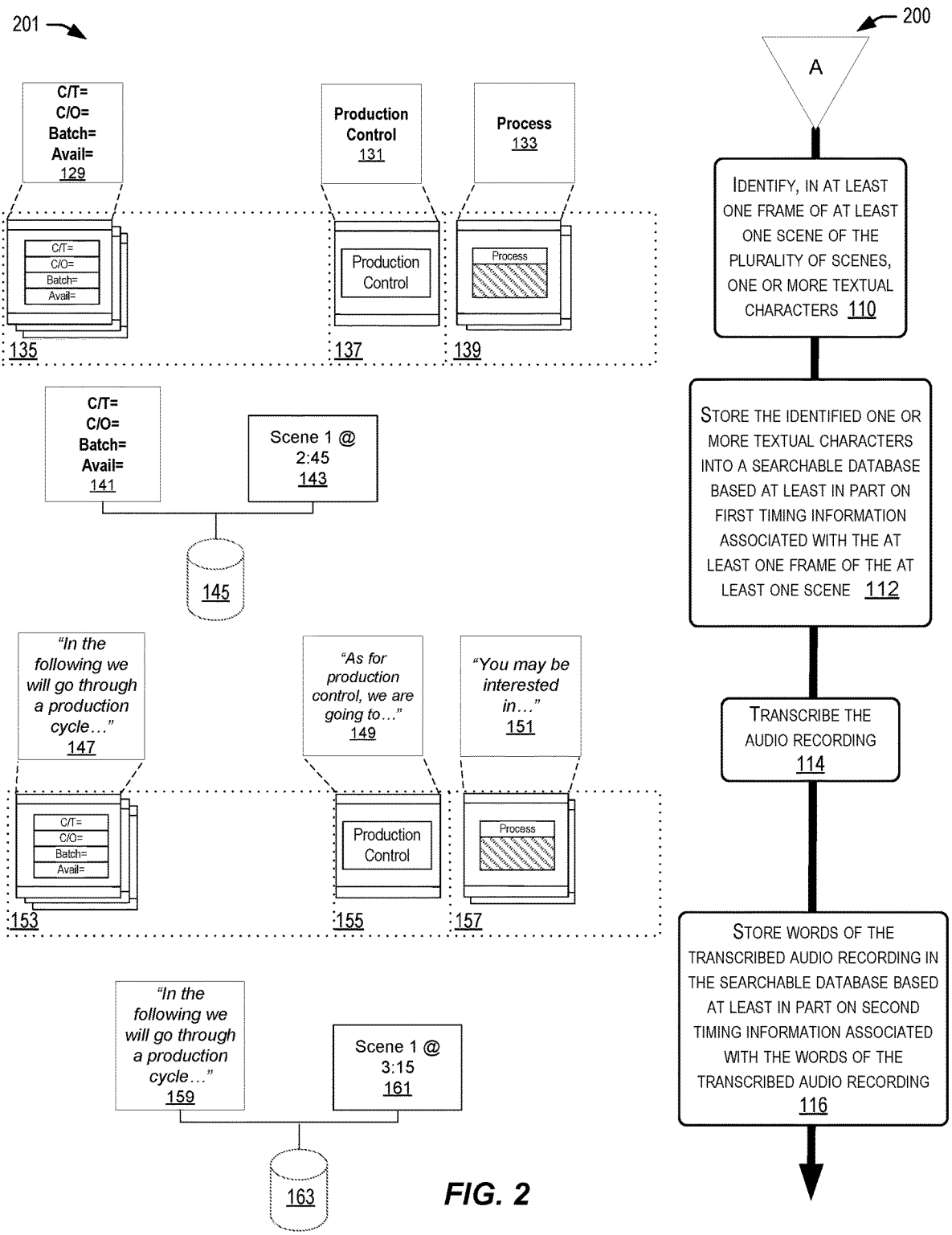
FIG. 2 is another simplified block diagram illustrating at least some example techniques for scene detection and character extraction from audiovisual content, according to some embodiments.

FIG. 1 illustrates operations of process 100 that span both FIGS. 1 and 2, and collectively correspond to an example high-level process for scene detection and character extraction from audiovisual content. The operations of FIG. 1 may correspond to a first phase of the process, in which the system segments the audiovisual content into scenes. The operations of FIG. 2 may correspond to a second phase of the process that follows the first phase, in which characters are stored and indexed after the characters are extracted from video frames (e.g., using an OCR process) and the audio recording. The characters and audiovisual content are stored and indexed with timing information so that a character search will identify relevant scenes from the audiovisual content.

The diagram 101 of FIG. 1 depicts example states that correspond to the first phase of the process 100, and the diagram 201 of FIG. 2 depicts example states that correspond to the second phase of process 100.

Turning to the process 100 in further detail, at block 102, the computer implemented method includes receiving audiovisual content comprising a plurality of video frames and an audio recording. Using diagram 101 for further illustration, the audiovisual content includes a plurality of frames 103 and the content can include an audio recording. In addition to a visual component (e.g., video frames) and an audio component (e.g., audio recording), the audiovisual content can also include timing information. Each video frame can have timing information (e.g., a timestamp or time code) or the timing information could be derived from the audiovisual content's properties (e.g., framerate or video frame number).

At block 104, the method includes determining, for a frame of the plurality of video frames, a first score based at least in part on the visual characteristics of the frame. For example, continuing with the illustration of diagram 101, upon receiving a first frame 105, the computer implementing the method may generate a first score 107 based on the visual characteristics of the first frame 105. The first score 107 can apply to any frame in the plurality of video frames and is not limited to the first frame 105 of the plurality of video frames. In some circumstances, the first frame 105 can also refer to the next frame in the plurality of frames, and any frame in the plurality of frames can be the first frame 105 and have a first score 107. In other words, the "first" frame may just be the first frame that is analyzed with respect to all subsequent frames. For example, the first score could be based on the color of pixels in the first frame 105. In one implementation, each pixel is individually given a numerical value based on its color. In an alternative implementation, the score could be a histogram with columns corresponding to different colors (e.g., a column for red). The column's value represents the number of pixels that are shaded the column's corresponding color. In a different embodiment, the score is based on the shape of objects identified in the frame (e.g., ECR). The first frame and a subsequent frame are turned into images containing the outlines of objects in the frame (e.g., edge pictures). The images' object outlines are compared to determine a score (e.g., a probability that the same objects are in the first frame and subsequent frame). Two or more of the above methods can be combined to create a score. Additionally, the methods can be equally weighted or different methods can be given different weights when calculating a score.

At block 106, the method includes determining whether a difference between the first score and subsequent scores for subsequent frames of the plurality of video frames is above a threshold. For example, a first score 113 can be generated based on the visual characteristics of 109. In some implementations the score can be based in part on a comparison with subsequent slides 111 (e.g., ECR). In other implementations a subsequent score 115 is generated for the subsequent slides 111 based on the subsequent slide's visual characteristics (e.g., histogram differences). The first score is compared to the subsequent scores to determine the difference between the first score and subsequent scores. If this difference is below a threshold, the first slide 109 and subsequent slides 111 are categorized as part of the same scene. If the difference is above a threshold, the subsequent scene is categorized as beginning a new scene.

At block 108, the method includes segmenting the plurality of video frames into a plurality of scenes based on the determination that the score is above a threshold. In one example, slides that are below a threshold are grouped together as a scene. The first scene 123 contains a plurality of frames 117, but there is no minimum number of frames for a scene and the second scene 125 contains a single frame 119. The audiovisual content can be divided into further scenes 127 until all of the frames 121 have been grouped into a scene.

FIG. 2 illustrates a second phase of the process 200, whereby diagram 201 of FIG. 2 depicts example states that correspond to the second phase of process 200.

Turning to the second phase of process 100 in further detail (e.g., as indicated by the triangle marker "A"), at block 110, the method includes identifying, in at least one frame of at least one scene of the plurality of scenes, one or more textual characters. For example, textual characters 129 can be identified in a scene 135 using OCR. Depending on the implementation, OCR can be run on different amounts of frames per scene depending on the circumstances. For instance, if audiovisual content contains a large number of scenes, OCR may be run only on a scene's first frame. In other implementations, the number of frames analyzed with OCR can depend on the scene length. For instance, textual characters 131 may only be identified in a single frame for a short scene 137 while textual characters 133 may be identified in more frames for a longer scene 139.

At block 112, the method includes storing the identified one or more textual characters into a searchable database based at least in part on first timing information associated with the at least one frame of the at least one scene. For example, the characters identified in a scene 141 can be stored in a database 145 with that scene's timing information 143. The timing information 143 can be a timestamp from the audiovisual content (e.g., scene 2 begins at 2:45), or derived from the video frame's order (e.g., scene 2 begins on frame 100). The database can contain identified textual characters from one or more videos. A search of the database for a term can return results (e.g., scenes) from multiple instances of audiovisual content. In some implementations, the search results can be combined to form new audiovisual content including the scenes returned by the search. The process for searching the database and combining search results to create new audiovisual content is addressed in greater detail in the discussion of block 116 below.

At block 114, the method includes transcribing the audio recording. For example, the audio component of the audiovisual content (e.g., audio recording) can be transcribed using a transcription method (e.g., trained machine learning model). The audio from each scene 153-157 can be transcribed 147-151 into textual characters, words, or sentences.

At block 116, the method includes storing words of the transcribed audio recording in the searchable database based at least in part on second timing information associated with the words of the transcribed audio recording. For example, the transcribed audio 159 can be stored in the database 163 with the timing information 161 associated with the transcribed characters. In some implementations, the transcribed words can be stored with the timing information for the scene associated with the transcribed words (e.g., beginning of scene 2 at 2:45), or based on when the word is spoken (e.g., middle of scene 2 at 4:00). The searchable database can contain words of transcribed audio from one or more audio recordings. The database can also contain identified textual characters stored in block 112. A search of the database for a term can return results from one or more instances of audiovisual content. The search can identify results containing extracted characters, transcribed words or both. In some implementations, the user is presented with an interface so the user can select the sources for the search (e.g., transcribed audio from multiple videos or a combination of transcribed audio and extracted characters from one video). The results can include a machine readable file format (e.g., machine readable JSON) containing the content source (e.g., source video), the matching text (e.g., text from the transcription that matches the search terms), a start point (e.g., a first time code or a first video frame number) and an end point (e.g., a second time code or a second video frame number). The search results can also include a clip of audiovisual content that contains the audio of the searched term. The clip can be generated by inputting the start point and end point into a generic video editing algorithm. The clip can begin at or before the point in the audiovisual content where the term was spoken or shown in a frame (e.g., a clip beginning 30 seconds before the term "planning" is spoken). The clip can last until the current scene has ended or for a specified time after the term was spoken or shown in a frame (e.g., 30 seconds after the term "planning" was spoken).

In some implementations, the search results can be combined to form new audiovisual content including scenes or clips returned or identified by the search of the database. The new audiovisual content can be created using a single instance of audiovisual content (e.g., a single video) or it can be created using multiple instances of audiovisual content (e.g., more than one video). The search results can include clips or the search results can be used to create clips by inputting the start point and end point into a generic video editing algorithm. In some implementations, the clips can be presented to a user who can select which clips to include in the new audiovisual content. The clips can be combined using a generic video editing algorithm to produce the new audiovisual content.

Figure 3:
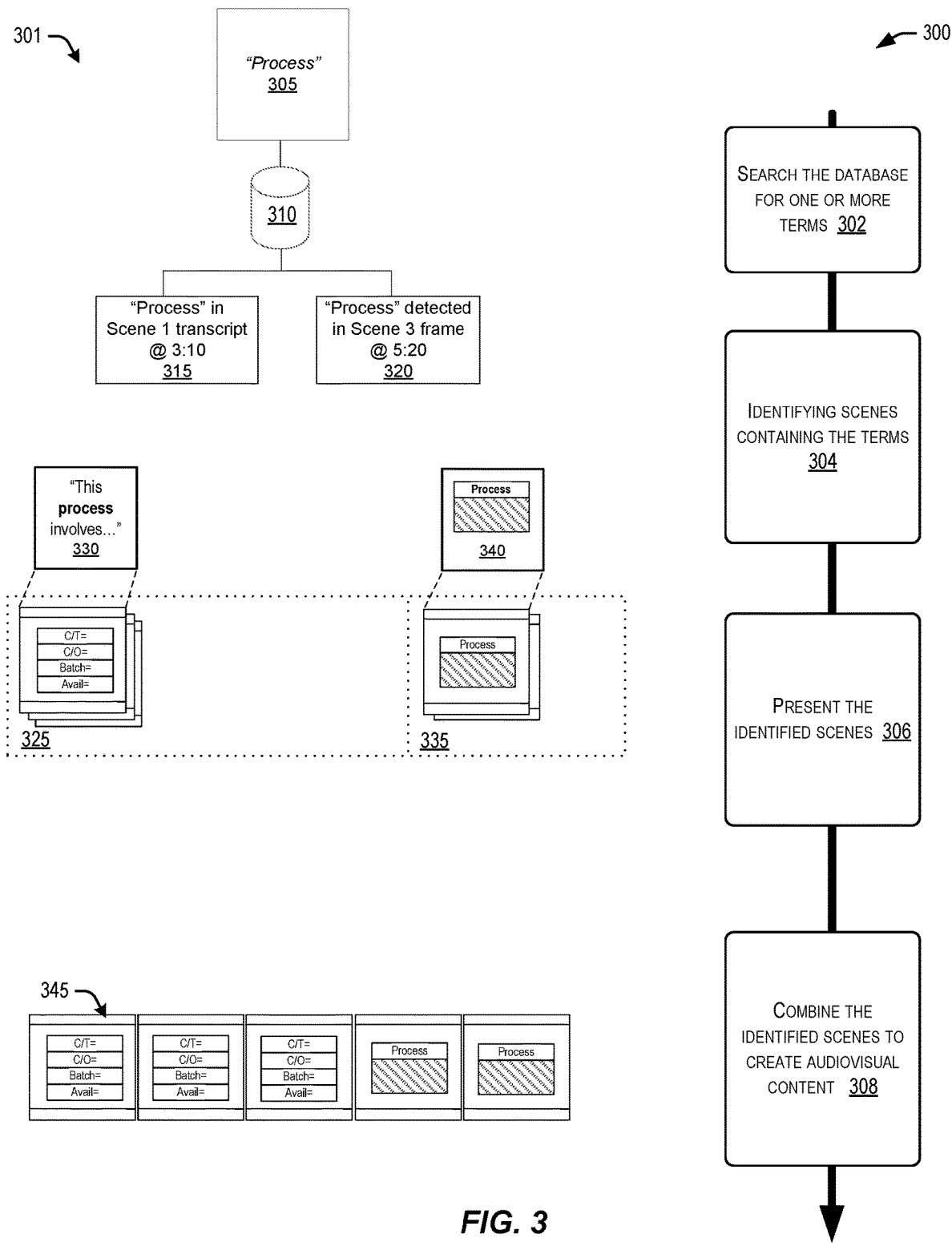
FIG. 3 is a simplified block diagram illustrating at least some example techniques for creating condensed audiovisual content, according to some embodiments.

FIG. 3 illustrates a process 300 that corresponds to a high-level example process for creating condensed audiovisual content. The diagram 301 of FIG. 3 depicts example states that correspond to process 300. This process is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Turning to the process 300 in greater detail, at block 302, the database can be searched for one or more terms. Using diagram 301 for further illustration, the term can be process 305. The term process 305 can be provided to the database 310 as a search query. A user can provide the search terms to the computing device, or computing devices, storing the database via a user interface. A user can provide the one or more terms via a search module of a user device. The user can specify, via the user interface, whether the database should be searched for terms that were transcribed from audio and/or terms that were identified through optical character recognition (OCR).

The audiovisual content queried during a search can be specified through a user interface. While the entire database can be queried during a search, the search can also be limited to one or more instances of audiovisual content. A user could select specific audiovisual content to be searched. The audiovisual content could also be indexed by the date that the audiovisual content was generated. A search query could limit the searched audiovisual content to content that was generated during a specified range of dates or times. The audiovisual content can also be indexed by the entity, user, or account that generated the audiovisual content. A search query could be limited to content generated by one or more entity, users, or accounts.

At block 304, in response to the search query, the one or more terms can be identified in one or more scenes. The one or more terms can be identified in transcribed audio or in text detected via OCR. For instance, term process 305 can be identified in the Scene 1 transcript 315. The database can also be searched for words identified via optical character recognition. For instance, the term process 305 can be detected in one or more frames 320 from scene 3. The database can return one or more timestamps for the scenes where the one or more terms are identified. The timestamp can be for the beginning of scene 1, the end of scene 1, or when the term was spoken or identified by OCR. Similarly, the response to the search query could provide a video frame number corresponding to the beginning of scene 1, the end of scene 1, or when the term was spoken or identified by OCR.

At block 306, the identified scenes can be presented to a user. In some circumstances, the condensed video can be generated without presenting the scenes to a user. The identified scenes can be presented to the user via a user device. For instance, scene 1 325 and scene 3 335 can be presented to a user via a user interface. The user interface can also indicate where in the scene the one or more terms occur. Scene 1 can be presented with the scene's transcript 330. The term process 305 can be highlighted within the scene's transcript 330. Frames from the audiovisual content that correspond to times in the transcript where the searched for term was mentioned can also be presented.

Scenes where the one or more terms are identified via optical character recognition (OCR) can also be presented. For example, scene 3 335 can be presented via a user interface. Annotated frames 340 from scene 3 335 where the term was identified can also be presented. Annotated frames 340 can highlight, underline, make bold, or otherwise indicate the one or more terms. The results can also be presented with matching text preview that indicates to the user the text in the scene that matches the search query. The matching text can be identified in a transcript or from words or characters detected via optical character recognition (OCR). The matching text can be an exact match for the one or more terms, a synonym of the one or more terms, or substantially similar to the one or more terms (e.g., process can be matching text for processing).

Using a user interface, the user can exclude one or more of the identified scenes from the condensed video. The user, via the user interface, can also change the order of the identified scenes. The user can also select portions of the identified scenes that should be included in the condensed video using the user interface. For instance, the user can crop an identified scene to exclude a portion of the scene. The user can also specify that additional portions of the audiovisual content, beyond the identified scenes, should be included in a condensed video. For example, a portion of a scene preceding an identified scene can be included to provide context for the identified scene.

At block 308, the scenes can be combined to create audiovisual content. The scenes can be combined using audiovisual content processing software (e.g., FFmpeg). The response to the search query can include a source video for the identified scenes, a time code for the scenes, and a video frame number for the scenes. The source video for each of the scenes can be provided in a machine readable format (e.g., JavaScript Object Notation (JSON)). The start point and end point for each scene can be used to extract a clip from each scene's source video. The clips can be merged to form a condensed video 345. The clips can be merged with a transition between each clip. The clips can also be annotated to indicate a source video for each scene.

Figure 4:
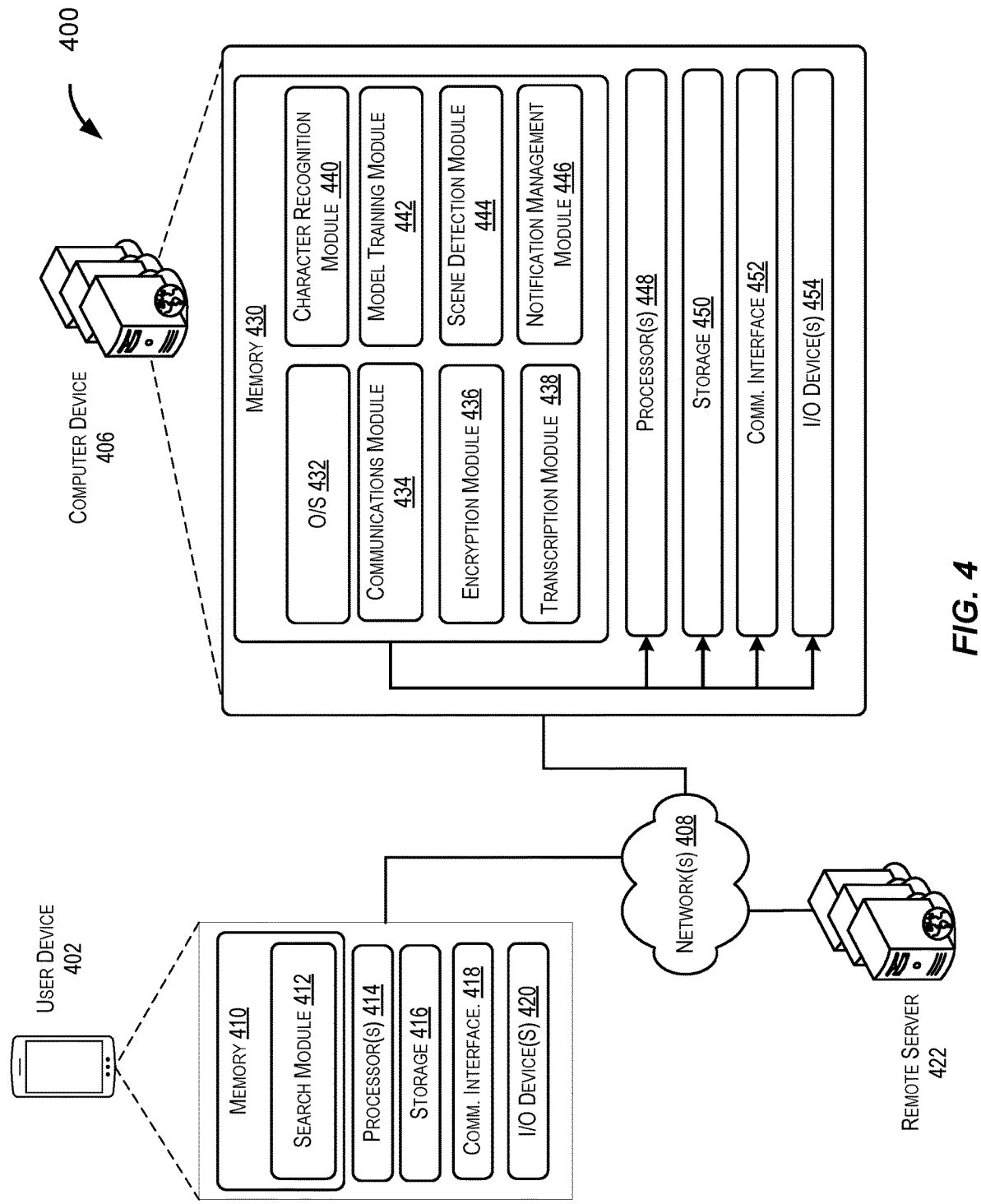
FIG. 4 is another simplified block diagram illustrating an example architecture of a system for scene detection and character extraction from audiovisual content, according to some embodiments.

FIG. 4 illustrates a simplified block diagram of an example architecture of a system used to provide automatic scene detection and character extraction, according to some embodiments. The diagram 400 includes a user device 402, a computer device 406, a network 408, and a remote server 422. The user device 402 and the computer device 406, respectively, may be similar to any of the user devices and/or computer devices described herein. The remote server 422 may correspond to one or more server computers (e.g., a server cluster) of a cloud computing platform, as described herein.

The network 408 may include any suitable communication path or channel such as, for instance, a wire or cable, fiber optics, a telephone line, a cellular link, a radio frequency (RF) link, a WAN or LAN network, the Internet, or any other suitable medium. The network 408 may include any one or a combination of many different types of networks, such as cable networks, the Internet, wireless networks, cellular networks, and other private and/or public networks.

Turning to each element in further detail, the user device 402 may be any suitable computing device (e.g., a mobile phone, tablet, personal computer (PC), smart glasses, a smart watch, etc.). The user device 402 has at least one memory 410, one or more processing units (or processor(s)) 414, a storage unit 416, a communications interface 418, and an input/output (I/O) device(s) 420.

The processor(s) 414 may be implemented as appropriate in hardware, computer-executable instructions, firmware, or combinations thereof. Computer-executable instruction or firmware implementations of the processor(s) 414 may include computer-executable or machine executable instructions written in any suitable programming language to perform the various functions described.

The memory 410 may store program instructions that are loadable and executable on the processor(s) 414, as well as data generated during the execution of these programs. Depending on the configuration and type of user device 402, the memory 410 may be volatile (such as random access memory (RAM)) and/or non-volatile (such as read-only memory (ROM), flash memory, etc.). In some implementations, the memory 410 may include multiple different types of memory, such as static random access memory (SRAM), dynamic random access memory (DRAM) or ROM. The user device 402 may also include additional storage 416, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the storage 416 may be utilized to storage a photo library containing one or more images on the user device 402.

The user device 402 may also contain the communications interface 418 that allow the user device 402 to communicate with a stored database, another computing device or server, user terminals, and/or other devices on the network(s) 408. The user device 402 may also include I/O device(s) 420, such as for enabling connection with a keyboard, a mouse, a pen, a voice input device, a touch input device, a display, speakers, a printer, etc.

Turning to the contents of the memory 410 in more detail, the memory 410 may include an operating system and one or more application programs or services for implementing the features disclosed herein, including a search module 412. The search module 412 may be responsible for performing one or more tasks, including receiving (and/or sending) data (e.g., audiovisual content) from the computer device 406 or remote server 422. For example, the search module 412 may receive input requesting audiovisual content from the server 422. As described herein, one example may be a request for any audiovisual content stored in the remote server 422 matching a plain language search (e.g., any audiovisual content indexed with the term "program"). In another example, the search module 412 can transmit a message with additional indexing terms for stored audiovisual content (e.g., adding the term "program" to a stored scene). In another example, the search module 412 can send a message to correct or remove textual characters associated with a scene. These messages may be transmitted on any suitable cadence and/or selection algorithm. In some embodiments, the user device 402 may first encrypt messages that are transmitted to the computer device 406 or remote server 422. For example, the user device 402 and the computer device 406 may share an encryption key (e.g., a symmetric key), whereby the computer device 406 receives an encrypted message and then decrypts the image using the encryption key. In some embodiments, as described further herein, the encryption key may not be shared (or may be shared) with the remote server 422. In some embodiments, the messages may be first transmitted to the remote server 422 (e.g., for temporary storage), and then later transmitted by the remote server 422 to the computer device 406. In some embodiments, the messages may be transmitted directly to the computer device 406, without involving the remote server 422. It should be understood that one or more functions of the search module 412 may be performed by the user device 406 (e.g., configuring the user device).

In some embodiments, as described above, the remote server 422 may correspond to a cloud computing platform. The remote server 422 may perform one or more functions, including, for example: sending audiovisual content to a user device 402 or a computer device 406, receiving messages from user devices (e.g., user device 402), transmitting messages to a computer device 406, etc. As described above, in some embodiments, the remote server 422 may not (or may) have access to an encryption key used by the user device 402 to encrypt images. In some embodiments, remote server 422 may receive messages from the user device 402 (and/or observation camera 404), for example, when the user device 402 does not have direct access to the computer device 406. In this example, the user device 402 may first transmit an encrypted message to the remote server 422 in the cloud. The cloud may store the encrypted message for later transmission to the computer device 406.

Turning to the computer device 406 in further detail, the computer device 406 may be a computer system that comprises at least one memory 430, one or more processing units (or processor(s)) 448, a storage unit 450, a communication device 452, and an I/O device 454. In some embodiments, these elements may be implemented similarly (or differently) than as described in reference to similar elements of user device 402. In some embodiments, the storage unit 450 may store messages or audiovisual content received by user device 402 and/or remote server 422. The computer device 406 may be housed in any suitable unit (e.g., a smart TV, a smart speaker, etc.). As described herein, it should be understood that one or more of the elements described in diagram 400 (e.g., user device 402 and/or remote server 422) may be enabled to perform one or more of the operations of computer device 406.

Turning to the contents of the memory 430 in more detail, the memory 430 may include an operating system 432 and one or more application programs or services for implementing the features disclosed herein, including a communications module 434, an encryption module 436, a transcription module 438, a character recognition module 440, a model training module 442, a scene detection module 444, and decision management module 446. In some embodiments, one or more application programs or services of memory 430 may be included as part of the scene detection and character extraction service of FIG. 1.

The communications module 434 may comprise code that causes the processor 448 to generate messages, forward messages, reformat messages, and/or otherwise communicate with other entities. For example, the communications module 434 may receive (and/or transmit) audiovisual content from the user device 402 and/or remote server 422. The communications module 434 may also be responsible for providing responses to search requests. For example, the communications module 434 may transmit audiovisual content corresponding to a scene to the user device 402 upon receiving a search inquiry.

The encryption module 436 may comprise code that causes the processor 448 to encrypt and/or decrypt messages. For example, the encryption module 436 may receive encrypted data (e.g., an encrypted audiovisual content) from the remote server 422. The encryption module 436 may include any suitable encryption algorithms to encrypt data. Suitable data encryption algorithms may include Data Encryption Standard (DES), tripe DES, Advanced Encryption Standard (AES), etc. It may also store (e.g., in storage unit 450) encryption keys (e.g., encryption and/or decryption keys) that can be used with such encryption algorithms. The encryption module 436 may utilize symmetric or asymmetric encryption techniques to encrypt and/or verify data. For example, as noted above, the user device 402 may contain similar code and/or keys as encryption module 436 that is suitable for encrypting/decrypting data communications with the computer device (and/or remote server 422).

The transcription module 438 may comprise code that causes the processor 448 to transcribe audio content into textual characters. For example, the transcription module 438 may receive audio content (e.g., audio recording) from one or more user devices and/or microphones, each the audio content containing speech. The transcription module 440 may determine (e.g., via a trained machine learning model) any words spoken in the audio content. The transcription module 440 may also organize the spoken words into sentences with punctuation. In some embodiments, this module 440 may associate an identity with a speaker based on the speech patterns and vocal characteristics. In some embodiments, elements of the profile may be respectively updated according to any suitable cadence and/or heuristic.

The character recognition module 440 may comprise code that causes the processor 448 to detect any textual characters in a frame using an algorithm or trained machine learning model. For example, as described herein, computer device 406 may determine one or more images that contain textual characters. The character recognition module 440 may then identify and store any textual characters in the image. In some embodiments, the character recognition module 440 may recognize a shape in the image (e.g., a slide in a video) and search for characters only in the recognized shape. In other embodiments, a user may indicate a region of the slides (e.g., left half of each slide) where the character recognition module 440 should identify characters.

The model training module 442 may comprise code that causes the processor 448 to train a machine learning model. The machine learning (ML) model may be trained to perform one or more sub-tasks, including, for example, identifying textual characters, detecting scene transitions, and/or transcribing speech in a recording for automatic scene detection and character extraction. In some embodiments, the model training module 442 may utilize any suitable machine learning technique. Some non-limiting examples may include utilizing a neural network, support vector machines, nearest neighbor approach, or decision trees. It should be understood that, in some embodiments, the operations of the model training module 442 may also be performed by the remote server 422.

The scene detection module 444 may comprise code that causes the processor 448 to determine a score that corresponds to a level of similarity between a first visual information (e.g., a first video frame) and a second visual information (e.g., a subsequent video frame). In some embodiments, the scene detection module 444 may utilize a trained ML model (e.g., via the model training module 442) to generate a score for the first and second visual information based on the visual information's visual characteristics. In some embodiments, as described herein, the scene detection module 444 may generate a first score and a second score based on the color of pixels in the visual information (e.g., sum of absolute differences or histogram differences). In other embodiments, the scores can be based on shapes in the visual information recognized by the scene detection module 444 (e.g., edge change ratio). In the event that the difference between the first score and the second score is above a threshold metric, the scene detection module 444 may thereby determine that a scene transition occurs at the second visual information. In the event that the score difference does not match (e.g., is less than) the threshold metric, the scene detection module 444 may compare scores for subsequent visual information to the first visual information until a scene change is detected (e.g., the difference exceeds the threshold). In another example, both scene detection based on pixel color and recognized shapes may be performed parallel to generate a combined score. In at least this way, techniques described here enable scene detection to be performed across a wider range of use cases and with a higher level of recall and/or precision.

The notification management module 446 may comprise code that causes the processor 448 to store and manage settings for providing notifications, as described herein. The notification management module 446 may also be responsible for generating notifications that are provided by the communications module 434. It should be understood that a notification may presented in any suitable form (e.g., text, audio, video, and/or suitable combinations).

Figure 5:
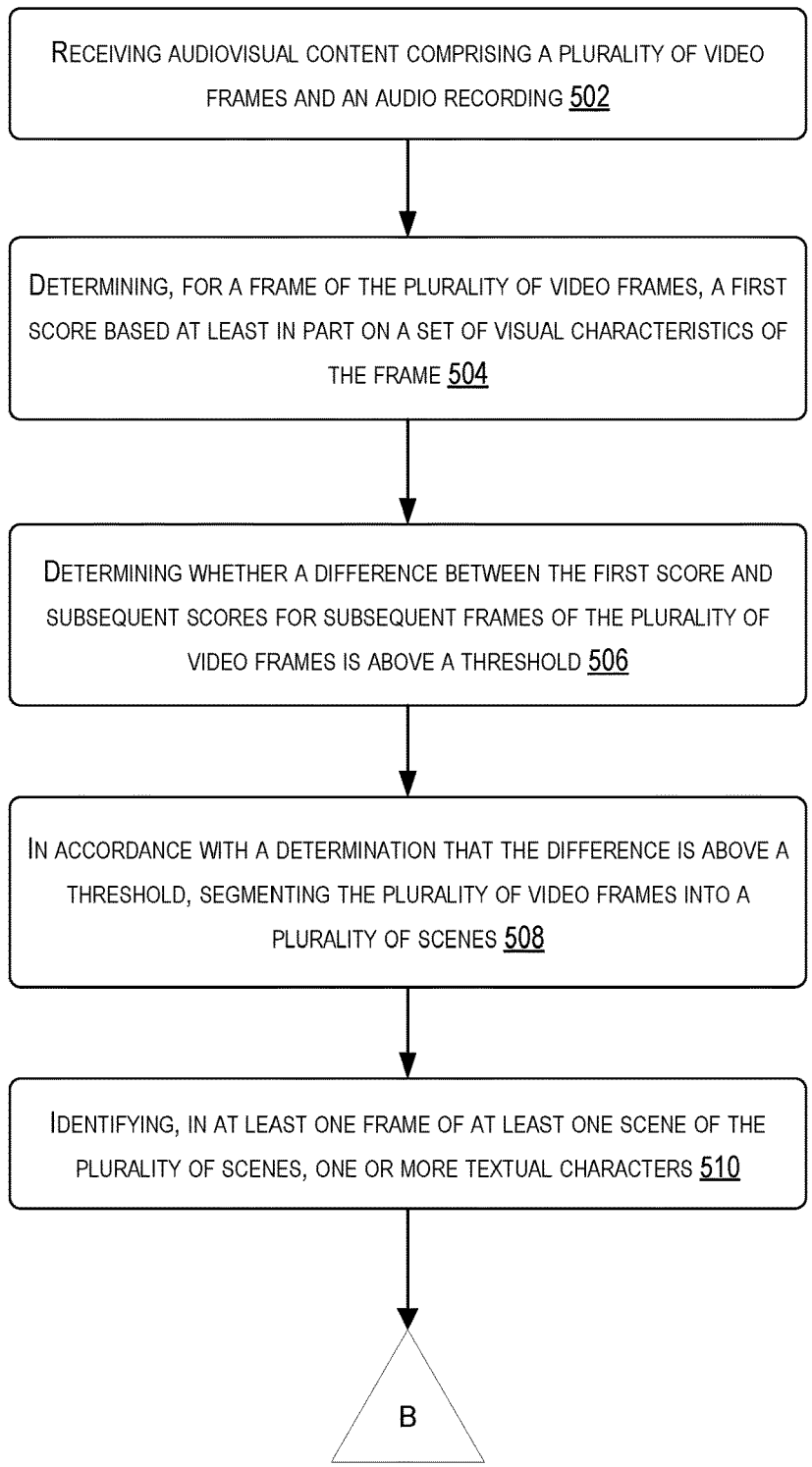
FIG. 5 is a simplified flow diagram illustrating a process for scene detection and character extraction from audiovisual content, according to some embodiments.
Figure 6:
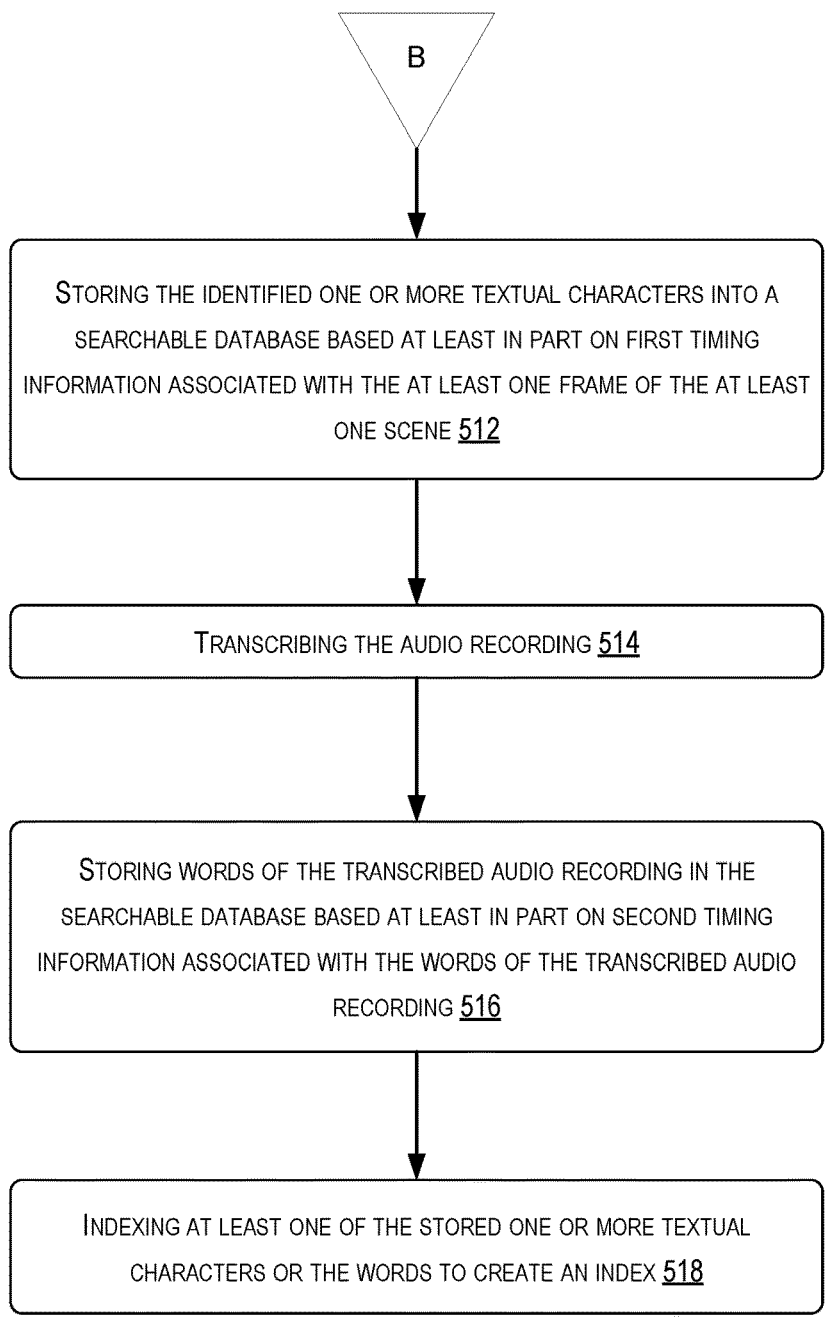

FIG. 5 illustrates simplified flow diagram of a process for scene detection and automatic character extraction that spans FIGS. 5 and 6 according to some embodiments. Process 500 of FIG. 5 may correspond to a first phase of the process (e.g., process 110 of FIG. 1), while process 600 of FIG. 6 may correspond to a second phase of the process (e.g., process 110 (e.g., as described in reference to FIG. 2). While the operations of process 500 and/or 600 are described as being performed by a generic computer, it should be understood that any suitable device (e.g., a user device, a server device) may be used to perform one or more operations of these processes. Process 500 and process 600 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

At block 502, during the first phase of the process, the method may include receiving audiovisual content comprising a plurality of video frames and an audio recording. In some embodiments, one or more operations of block 502 may be similar to one or more operations of block 112 of FIG. 1.

At block 504, the method may include determining, for a frame of the plurality of video frames, a first score based at least in part on a set of visual characteristics of the frame. In some embodiments, one or more operations of block 504 may be similar to one or more operations of block 114 of FIG. 1.

At block 506, the method may include determining whether a difference between the first score and subsequent scores for subsequent frames of the plurality of video frames is above a threshold. In some embodiments, one or more operations of block 506 may be similar to one or more operations of block 106 of FIG. 1.

At block 508, the method may include, in accordance with a determination that the difference is above a threshold, segmenting the plurality of video frames into a plurality of scenes. In some embodiments, one or more operations of block 508 may be similar to one or more operations of block 108 of FIG. 1.

At block 510, the method may include, identifying, in at least one frame of at least one scene of the plurality of scenes, one or more textual characters. In some embodiments, one or more operations of block 510 may be similar to one or more operations of block 110 of FIG. 2.

FIG. 6 illustrates the second phase of the process 600 in further detail, at block 512, the method may include storing the identified one or more textual characters into a searchable database based at least in part on first timing information associated with at least one frame of the at least one scene. In some embodiments, one or more operations of block 512 may be similar to one or more operations of block 112 of FIG. 2.

At block 514, the method may include transcribing the audio recording. In some embodiments, one or more operations of block 514 may be similar to one or more operations of block 114 of FIG. 2.

At block 516, the method may include storing words of the transcribed audio recording in the searchable database based at least in part on the second timing information associated with the words of the transcribed audio recording. In some embodiments, one or more operations of block 516 may be similar to one or more operations of block 116 of FIG. 2.

At block 518, the method can include indexing at least one of the stored one or more textual characters or the words to create an index. The characters or words can be indexed with the timing information associated with the audiovisual content. In some implementations the index can be searched for identified characters or transcribed words separately.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 7:
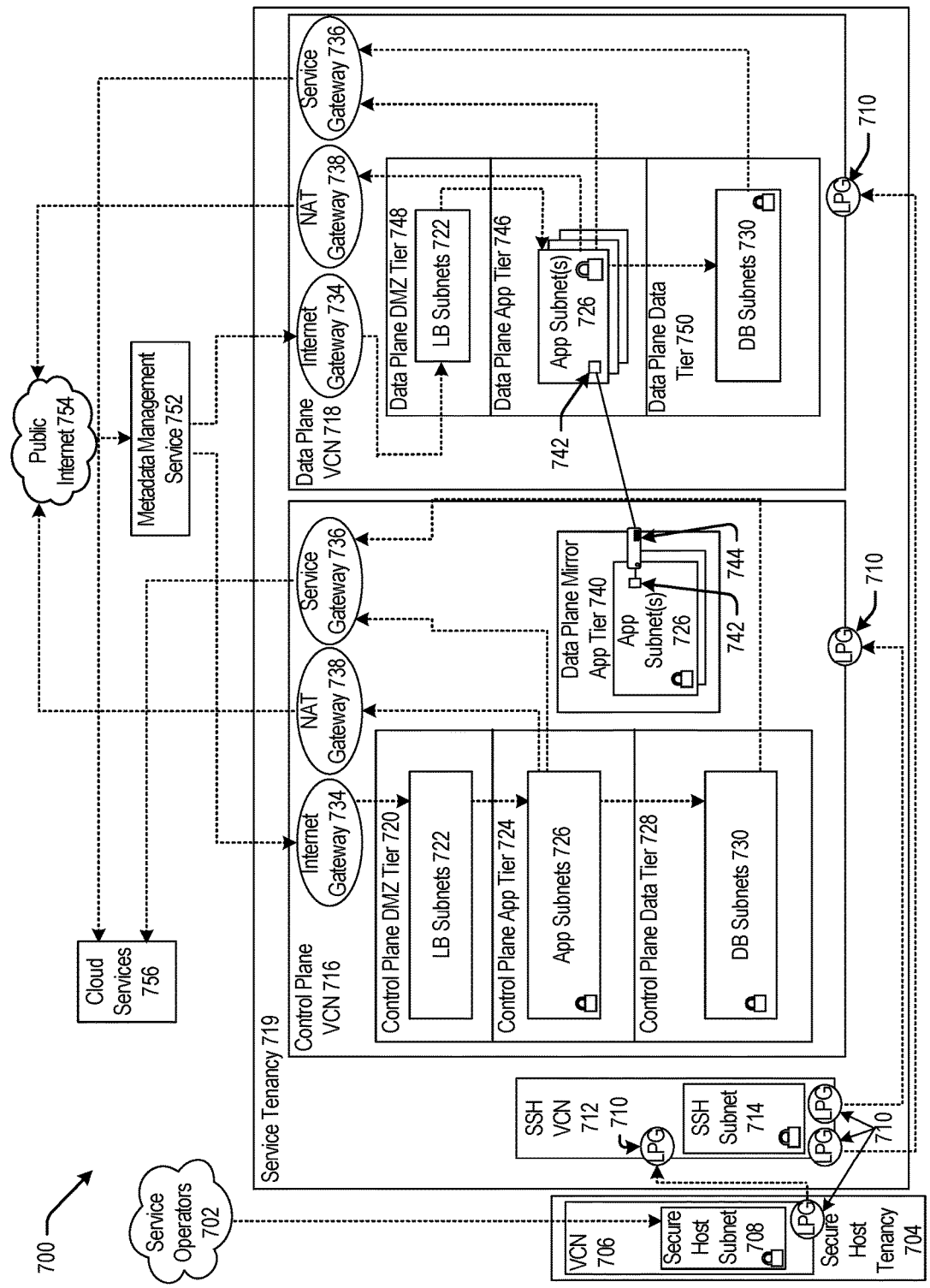
FIG. 7 is a block diagram illustrating one pattern for implementing a cloud infrastructure as a service system, according to at least one embodiment.

FIG. 7 illustrates a block diagram 700 of an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 7, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep security breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively couple to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Memory that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of security, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
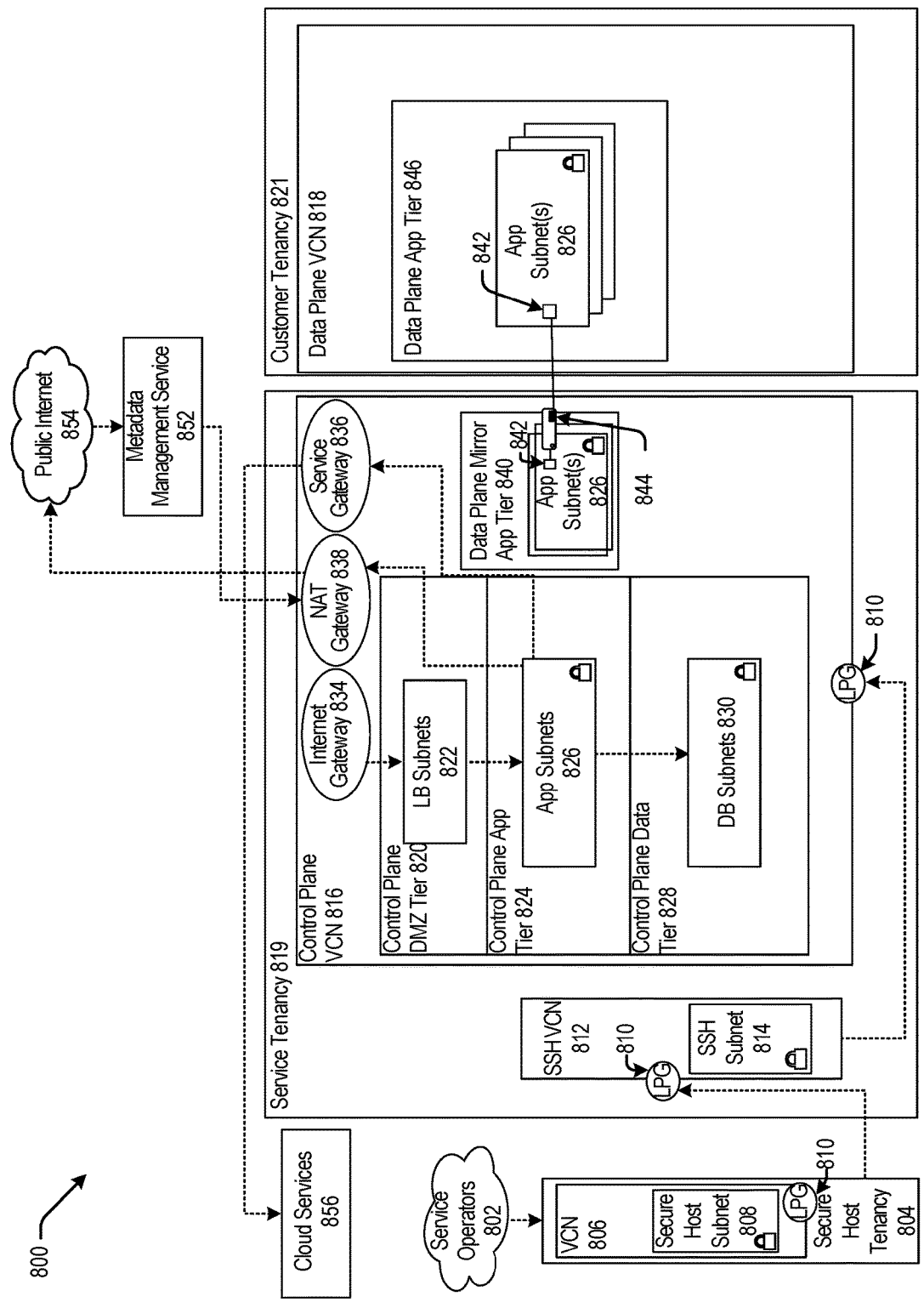
FIG. 8 is a block diagram illustrating another pattern for implementing a cloud infrastructure as a service system, according to at least one embodiment.

FIG. 8 illustrates a block diagram 800 of another example pattern of an IaaS architecture, according to at least one embodiment. Service operators 802 (e.g. service operators 702 of FIG. 7) can be communicatively coupled to a secure host tenancy 804 (e.g. the secure host tenancy 704 of FIG. 7) that can include a virtual cloud network (VCN) 806 (e.g. the VCN 706 of FIG. 7) and a secure host subnet 808 (e.g. the secure host subnet 708 of FIG. 7). The VCN 806 can include a local peering gateway (LPG) 810 (e.g. the LPG 710 of FIG. 7) that can be communicatively coupled to a secure shell (SSH) VCN 812 (e.g. the SSH VCN 712 of FIG. 7) via an LPG 710 contained in the SSH VCN 812. The SSH VCN 812 can include an SSH subnet 814 (e.g. the SSH subnet 714 of FIG. 7), and the SSH VCN 812 can be communicatively coupled to a control plane VCN 816 (e.g. the control plane VCN 716 of FIG. 7) via an LPG 810 contained in the control plane VCN 816. The control plane VCN 816 can be contained in a service tenancy 819 (e.g. the service tenancy 719 of FIG. 7), and the data plane VCN 818 (e.g. the data plane VCN 718 of FIG. 7) can be contained in a customer tenancy 821 that may be owned or operated by users, or customers, of the system.

The control plane VCN 816 can include a control plane DMZ tier 820 (e.g. the control plane DMZ tier 720 of FIG. 7) that can include LB subnet(s) 822 (e.g. LB subnet(s) 722 of FIG. 7), a control plane app tier 824 (e.g. the control plane app tier 724 of FIG. 7) that can include app subnet(s) 826 (e.g. app subnet(s) 726 of FIG. 7), a control plane data tier 828 (e.g. the control plane data tier 728 of FIG. 7) that can include database (DB) subnet(s) 830 (e.g. similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g. the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g. the service gateway of FIG. 7) and a network address translation (NAT) gateway 838 (e.g. the NAT gateway 738 of FIG. 7). The control plane VCN 816 can include the service gateway 836 and the NAT gateway 838.

The control plane VCN 816 can include a data plane mirror app tier 840 (e.g. the data plane mirror app tier 740 of FIG. 7) that can include app subnet(s) 826. The app subnet(s) 826 contained in the data plane mirror app tier 840 can include a virtual network interface controller (VNIC) 842 (e.g. the VNIC of 742) that can execute a compute instance 844 (e.g. similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g. the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g. the metadata management service 752 of FIG. 7) that can be communicatively coupled to public Internet 854 (e.g. public Internet 754 of FIG. 7). Public Internet 854 can be communicatively coupled to the NAT gateway 838 contained in the control plane VCN 816. The service gateway 836 contained in the control plane VCN 816 can be communicatively couple to cloud services 856 (e.g. cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

Figure 9:
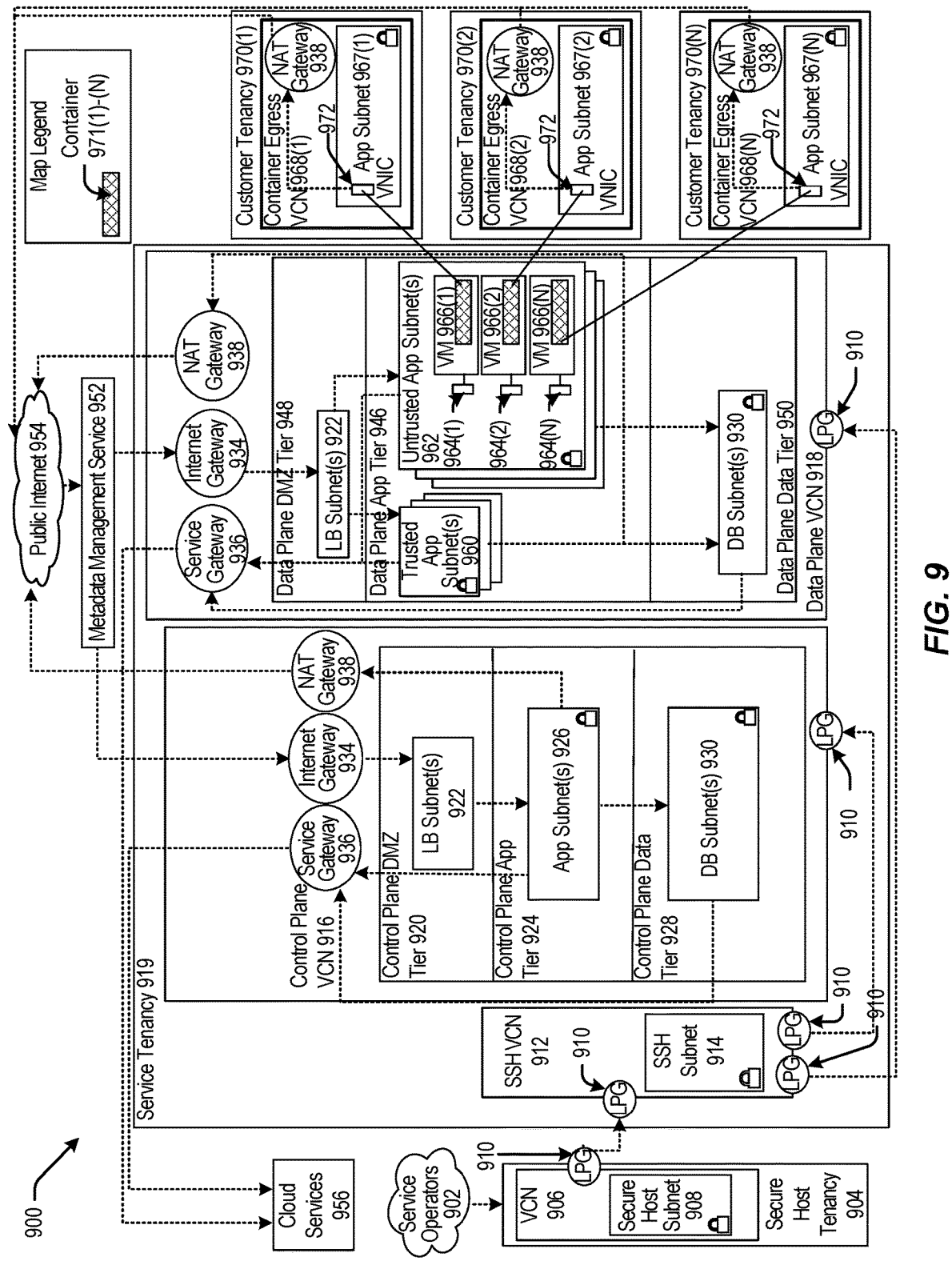
FIG. 9 is a block diagram illustrating another pattern for implementing a cloud infrastructure as a service system, according to at least one embodiment.

FIG. 9 illustrates a block diagram 900 of another example pattern of an IaaS architecture, according to at least one embodiment. Service operators 902 (e.g. service operators 702 of FIG. 7) can be communicatively coupled to a secure host tenancy 904 (e.g. the secure host tenancy 704 of FIG. 7) that can include a virtual cloud network (VCN) 906 (e.g. the VCN 706 of FIG. 7) and a secure host subnet 908 (e.g. the secure host subnet 708 of FIG. 7). The VCN 906 can include an LPG 910 (e.g. the LPG 710 of FIG. 7) that can be communicatively coupled to an SSH VCN 912 (e.g. the SSH VCN 712 of FIG. 7) via an LPG 910 contained in the SSH VCN 912. The SSH VCN 912 can include an SSH subnet 914 (e.g. the SSH subnet 714 of FIG. 7), and the SSH VCN 912 can be communicatively coupled to a control plane VCN 916 (e.g. the control plane VCN 716 of FIG. 7) via an LPG 910 contained in the control plane VCN 916 and to a data plane VCN 918 (e.g. the data plane 718 of FIG. 7) via an LPG 910 contained in the data plane VCN 918. The control plane VCN 916 and the data plane VCN 918 can be contained in a service tenancy 919 (e.g. the service tenancy 719 of FIG. 7).

The control plane VCN 916 can include a control plane DMZ tier 920 (e.g. the control plane DMZ tier 720 of FIG. 7) that can include load balancer (LB) subnet(s) 922 (e.g. LB subnet(s) 722 of FIG. 7), a control plane app tier 924 (e.g. the control plane app tier 724 of FIG. 7) that can include app subnet(s) 926 (e.g. similar to app subnet(s) 726 of FIG. 7), a control plane data tier 928 (e.g. the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g. the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 7) and a network address translation (NAT) gateway 938 (e.g. the NAT gateway 738 of FIG. 7). The control plane VCN 916 can include the service gateway 936 and the NAT gateway 938.

The data plane VCN 918 can include a data plane app tier 946 (e.g. the data plane app tier 746 of FIG. 7), a data plane DMZ tier 948 (e.g. the data plane DMZ tier 748 of FIG. 7), and a data plane data tier 950 (e.g. the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g. public Internet 754 of FIG. 7).

The Internet gateway 934 contained in the control plane VCN 916 and contained in the data plane VCN 918 can be communicatively coupled to a metadata management service 952 (e.g. the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
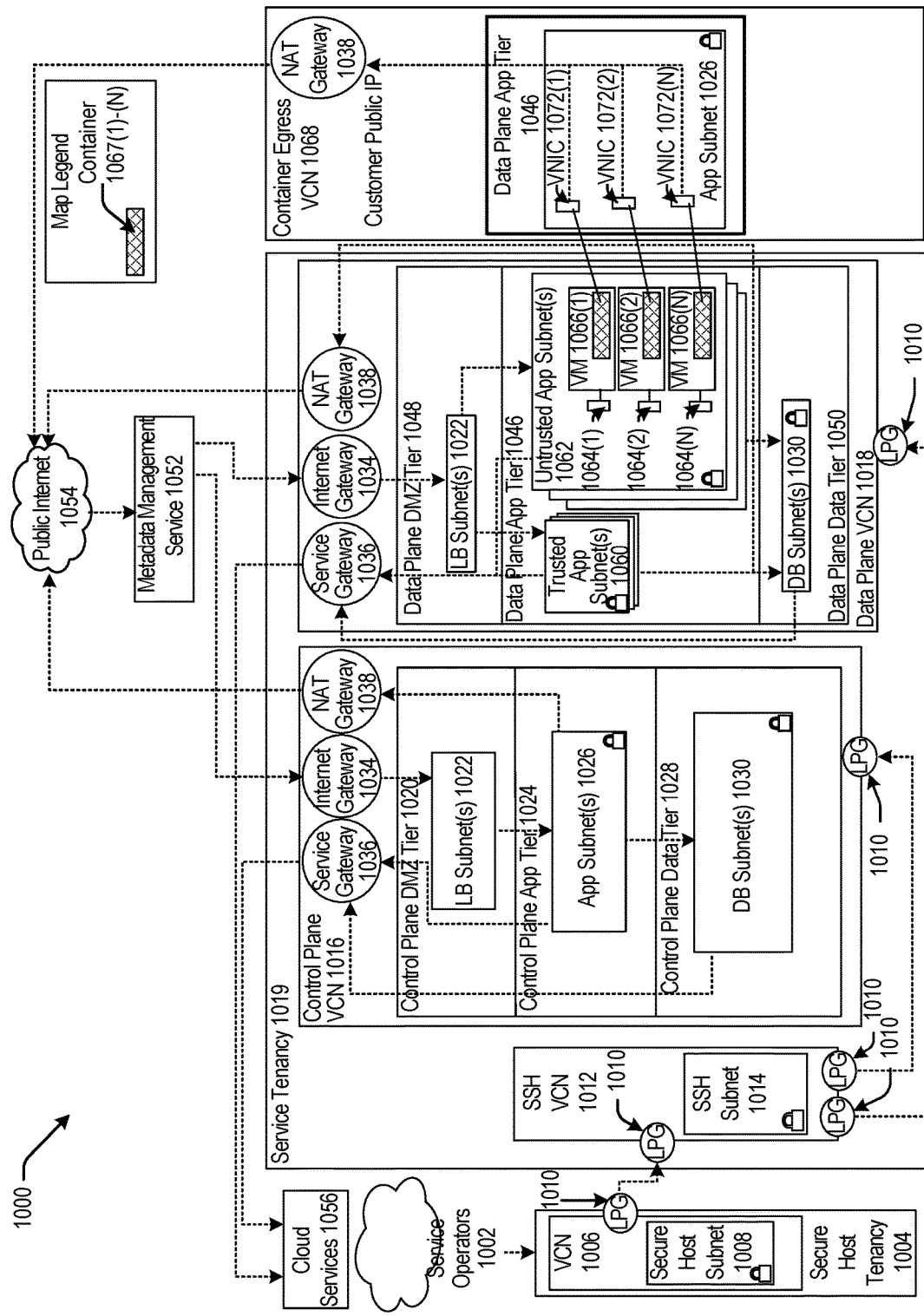
FIG. 10 is a block diagram illustrating another pattern for implementing a cloud infrastructure as a service system, according to at least one embodiment.

FIG. 10 illustrates a block diagram 1000 of another example pattern of an IaaS architecture, according to at least one embodiment. Service operators 1002 (e.g. service operators 702 of FIG. 7) can be communicatively coupled to a secure host tenancy 1004 (e.g. the secure host tenancy 704 of FIG. 7) that can include a virtual cloud network (VCN) 1006 (e.g. the VCN 706 of FIG. 7) and a secure host subnet 1008 (e.g. the secure host subnet 708 of FIG. 7). The VCN 1006 can include an LPG 1010 (e.g. the LPG 710 of FIG. 7) that can be communicatively coupled to an SSH VCN 1012 (e.g. the SSH VCN 712 of FIG. 7) via an LPG 1010 contained in the SSH VCN 1012. The SSH VCN 1012 can include an SSH subnet 1014 (e.g. the SSH subnet 714 of FIG. 7), and the SSH VCN 1012 can be communicatively coupled to a control plane VCN 1016 (e.g. the control plane VCN 716 of FIG. 7) via an LPG 1010 contained in the control plane VCN 1016 and to a data plane VCN 1018 (e.g. the data plane 718 of FIG. 7) via an LPG 1010 contained in the data plane VCN 1018. The control plane VCN 1016 and the data plane VCN 1018 can be contained in a service tenancy 1019 (e.g. the service tenancy 719 of FIG. 7).

The control plane VCN 1016 can include a control plane DMZ tier 1020 (e.g. the control plane DMZ tier 720 of FIG. 7) that can include LB subnet(s) 1022 (e.g. LB subnet(s) 722 of FIG. 7), a control plane app tier 1024 (e.g. the control plane app tier 724 of FIG. 7) that can include app subnet(s) 1026 (e.g. app subnet(s) 726 of FIG. 7), a control plane data tier 1028 (e.g. the control plane data tier 728 of FIG. 7) that can include DB subnet(s) 1030 (e.g. DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 7) and a network address translation (NAT) gateway 1038 (e.g. the NAT gateway 738 of FIG. 7). The control plane VCN 1016 can include the service gateway 1036 and the NAT gateway 1038.

The data plane VCN 1018 can include a data plane app tier 1046 (e.g. the data plane app tier 746 of FIG. 7), a data plane DMZ tier 1048 (e.g. the data plane DMZ tier 748 of FIG. 7), and a data plane data tier 1050 (e.g. the data plane data tier 750 of FIG. 7). The data plane DMZ tier 1048 can include LB subnet(s) 1022 that can be communicatively coupled to trusted app subnet(s) 1060 (e.g. trusted app subnet(s) 960 of FIG. 9) and untrusted app subnet(s) 1062 (e.g. untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g. public Internet 754 of FIG. 7).

The Internet gateway 1034 contained in the control plane VCN 1016 and contained in the data plane VCN 1018 can be communicatively coupled to a metadata management service 1052 (e.g. the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
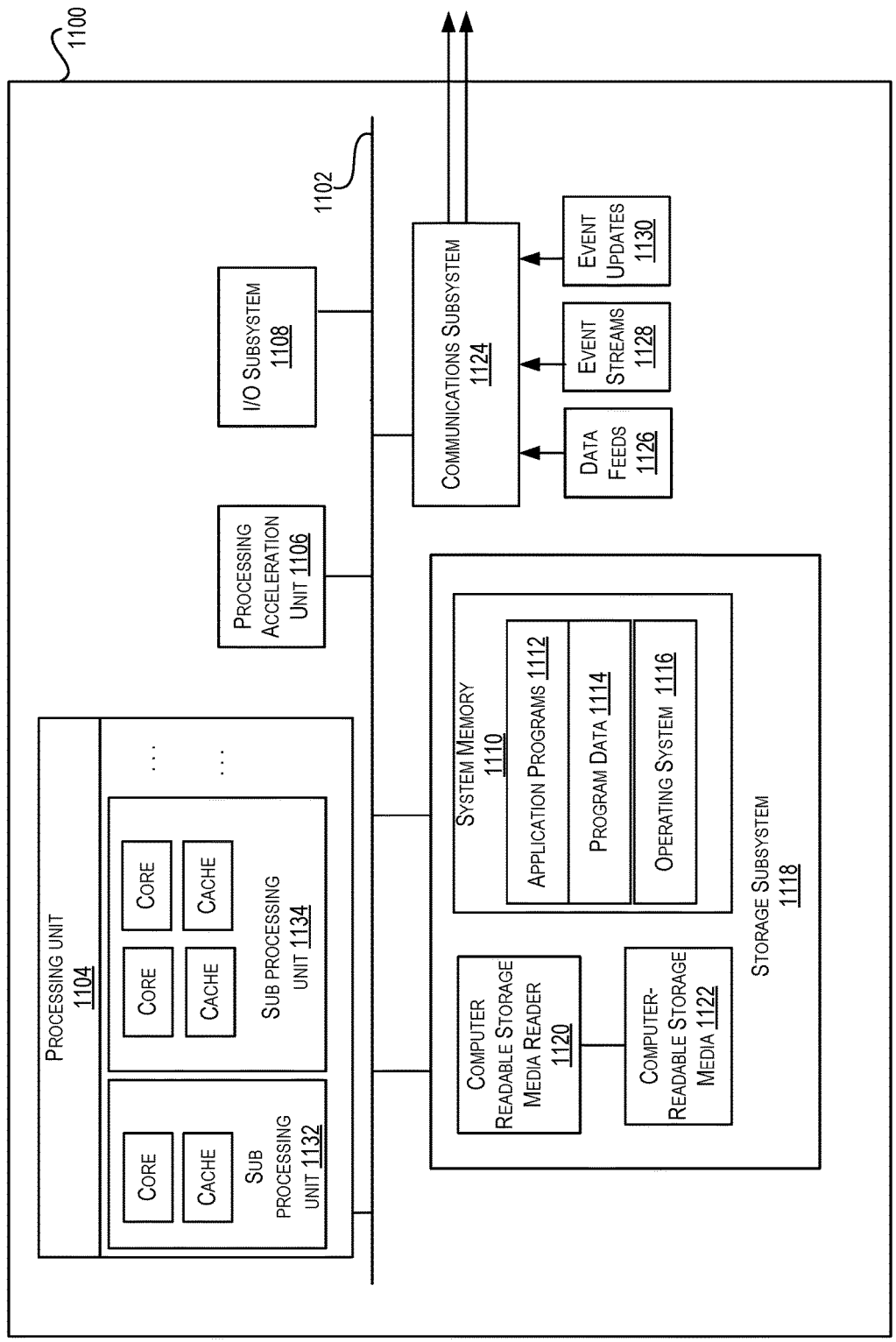
FIG. 11 is a block diagram illustrating an example computer system, according to at least one embodiment.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be computer in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present disclosure.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 702.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
   receiving audiovisual content comprising a plurality of video frames and an audio recording;
   determining, for a first frame of the plurality of video frames, a first score based at least in part on a set of visual characteristics of the frame;
   determining whether a difference between the first score and a second score for a second frame of the plurality of video frames is above a threshold;
   based at least on a determination that the difference, between the first score and the second score, is above a threshold:
      segmenting the plurality of video frames into a plurality of scenes, a first scene of the plurality of scenes comprising a particular subset of the plurality of video frames, the particular subset comprising a plurality of video frames;
   selecting a third frame of the first scene as a representative frame for the particular subset of video frames to extract one or more textual characters, wherein the one or more textual characters are present in two or more video frames of the particular subset of video frames in the first scene;
   identifying, in the third frame, the one or more textual characters associated with the first scene for storing into a searchable database;

storing the identified one or more textual characters into the searchable database in association with the third frame and in association with a remainder of the video frames of the subset of the first scene; and indexing at least one of the stored one or more textual characters to create an index.

2. The method of claim 1, wherein the audiovisual content comprises presentation slides.

3. The method of claim 2, wherein at least one of the one or more textual characters are identified within the presentation slides.

4. The method of claim 2, further comprising providing a user interface for searching the index of the stored one or more textual characters.

5. The method of claim 4, wherein the user interface comprises a filter option for filtering a search of the index based at least in part on a type of the audiovisual content.

6. The method of claim 1, wherein the visual characteristics comprise at least one of a set of object outlines for a set of objects identified by edge detection or a color of a plurality of pixels in the first frame.

7. The method of claim 6, wherein the score is based at least in part on a probability that a first object outline from the first frame and a subsequent object outline from the second frame are outlines of the same object.

8. The method of claim 6, wherein the score is based at least in part on a difference between the color of a plurality of pixels in the first frame and the color of a plurality of pixels in the second frame.

9. The method of claim 1, wherein at least one of the one or more textual characters are associated with a language.

10. The method of claim 1, wherein the indexing of the one or more textual characters is based at least in part on a timestamp associated with the one or more identified characters.

11. The method of claim 1, wherein indexing the stored one or more textual characters is based at least in part on a type of the audiovisual content.

12. The method of claim 1, wherein the plurality of video frames are segmented into a plurality of scenes by a trained machine learning model.

13. The method of claim 1, wherein the one or more textual characters are identified by a trained machine learning model.

14. The method of claim 1, further comprising:
searching the searchable database for one or more terms;
identifying, by the indexed textual characters, scenes containing the terms; and
combining the identified scenes to create audiovisual content.

15. One or more computer-readable storage media storing a set of instructions, that, when executed by one or more processors of a computing device, cause the computing device to perform instructions comprising:
receiving audiovisual content comprising a plurality of video frames and an audio recording;
determining, for a first frame of the plurality of video frames, a first score based at least in part on a set of visual characteristics of the frame;
determining whether a difference between the first score and a second score for a second frame of the plurality of video frames is above a threshold;
segmenting, based at least on a determination that the difference between the first score and the second score is above a threshold, the plurality of video frames into a plurality of scenes;
a first scene of the plurality of scenes comprising a particular subset of the plurality of video frames, the particular subset comprising a plurality of video frames;
selecting a third frame of the first scene as a representative frame for the particular subset of video frames to extract one or more textual characters, wherein the one or more textual characters are present in two or more video frames of the particular subset of video frames in the first scene;
identifying, in the third frame, the one or more textual characters associated with the first scene for storing into a searchable database;
storing the identified one or more textual characters into the searchable database in association with the third frame and in association with a remainder of the video frames of the subset of the first scene; and
indexing at least one of the stored one or more textual characters.

16. The one or more computer-readable media of claim 15, wherein the audiovisual content includes presentation slides.

17. The one or more computer-readable media of claim 16, wherein the one or more textual characters are located within the presentation slides.

18. A system, comprising:
a memory configured to store a plurality of instructions; and
one or more processors configured to access the memory, and to execute the plurality of instructions to at least:
receive audiovisual content comprising a plurality of video frames and an audio recording;
determine, for a first frame of the plurality of video frames, a first score based at least in part on a set of visual characteristics of the frame;
determine whether a difference between the first score and a second score for a second frame of the plurality of video frames is above a threshold;
based at least on a determination that the difference between the first score and the second score is above a threshold, segment the plurality of video frames into a plurality of scenes, a first scene of the plurality of scenes comprising a particular subset of the plurality of video frames, the particular subset comprising a plurality of video frames;
select a third frame of the first scene as a representative frame for the particular subset of video frames to extract one or more textual characters, wherein the one or more textual characters are present in two or more video frames of the particular subset of video frames in the first scene;
identify, in the third frame, the one or more textual characters associated with the first scene for storing into a searchable database;
store the identified one or more textual characters into the searchable database in association with the third frame and in association with a remainder of the video frames of the subset of the first scene; and
index at least one of the stored one or more textual characters.

19. The system of claim 18, wherein the visual characteristics include a set of object outlines for a set of objects identified by edge detection and a color of a plurality of pixels in the frame.

20. The system of claim 18, wherein indexing at the stored one or more textual characters is based at least in part on a type of audiovisual content where the one or more textual characters or the words were identified.

21. The method of claim 1, wherein the first scene comprises a set of frames including the first frame of the plurality of video frames and one or more subsequent frames, each frame in the set having a respective score, wherein the difference between a score for one frame in the set and a score for a frame adjacent to the one frame is below the threshold.

22. The method of claim 1, further comprising:
selecting a fourth frame of a second scene, of the plurality of scenes, as a representative frame for a plurality of video frames comprising the second scene, to extract one or more textual characters, wherein the one or more textual characters are present in two or more video frames of the second scene;
identifying, in the fourth frame, one or more textual characters associated with the second scene;
storing the identified one or more textual characters into the searchable database in association with the fourth frame and in association with a remainder of the video frames of the second scene; and
indexing at least one of the stored one or more textual characters.

\* \* \* \* \*